Dec. 10, 1957 P. ZUMBRUNNEN 2,815,849
EXTENSIBLE MULTI-SECTIONAL CONVEYORS
Filed June 1, 1954 2 Sheets-Sheet 2

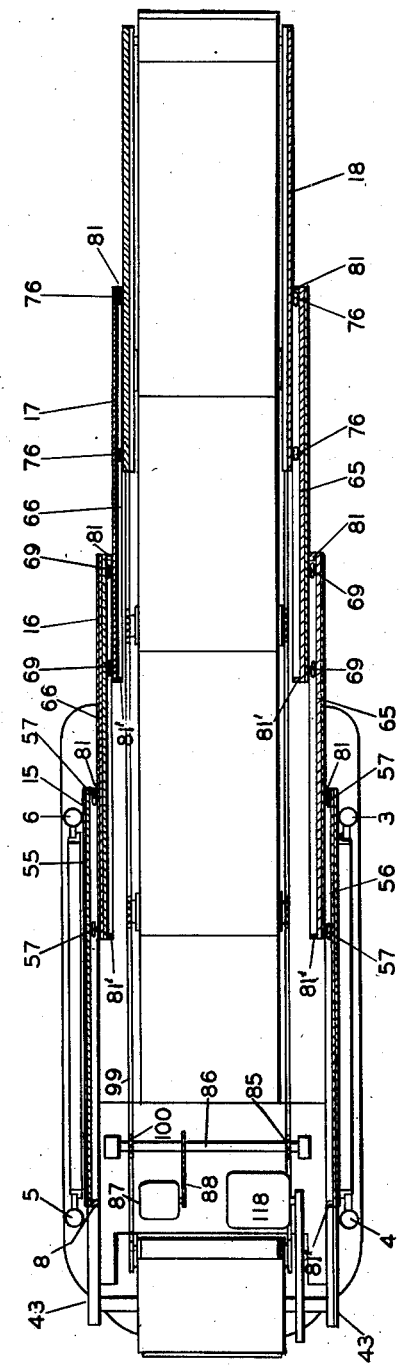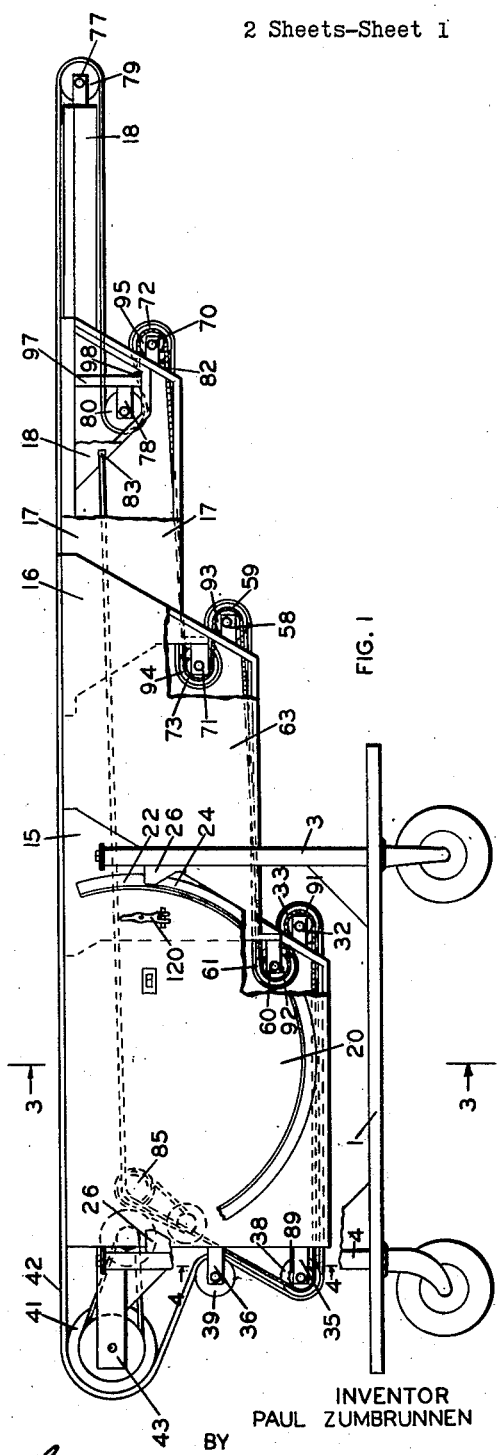

CHAIN MOTOR

BELT MOTOR

INVENTOR.
PAUL ZUMBRUNNEN
BY
Lockwood, Galt, Woodard & Smith
ATTORNEYS.

United States Patent Office 2,815,849
Patented Dec. 10, 1957

2,815,849

EXTENSIBLE MULTI-SECTIONAL CONVEYORS

Paul Zumbrunnen, Jeffersonville, Ind., assignor to Carry-Craft Corporation, Fort Wayne, Ind., a corporation Application June 1, 1954, Serial No. 433,628

8 Claims. (Cl. 198—139)

This invention relates generally to conveyors and more particularly to extensible multi-sectional conveyors and apparatus for extending and retracting such conveyors.

Many prior art extensible multi-sectional conveyors are equipped with power driven apparatus for extending and retracting the individual frames of the conveyor. Other forms of extensible conveyors have no such power-driven apparatus. In the case of those machines which are power driven for extension and retraction, the apparatus for performing this function is usually a multiple sectioned screw. Each section of such a screw is of appreciable length and certain sections must telescope within others. It is found in practice that the manufacture of a screw of such substantial length is an expensive and time consuming operation. Furthermore, such close tolerances must be maintained in cutting the thread that the ordinary thread cutting lathe is incapable of producing a lengthy thread which will run through a nut without binding. The problem becomes more complex when it is desired to telescope a plurality of such screws within one another. In this case close tolerances as to thread cutting become even more important and more difficult of achievement. Because of these expensive and intricate manufacturing operations it is found in practice that ordinary manufacturing machinery is incapable of producing a screw satisfactory for the purpose of extending and retracting a multiple sectioned conveyor.

Accordingly, it is a principal object of this invention to provide novel power-driven apparatus for extending and retracting a multiple sectioned conveyor.

A further object of this invention is to provide an extensible conveyor apparatus which is simple in construction and which does not require many manufacturing operations held within close tolerances.

A still further object of this invention is to provide, in an extensible conveyor, apparatus for extending and retracting the conveyor which is fool-proof in operation and which does not become inoperative due to the accumulation of foreign substances inherently present in many conveying operations.

Another object of this invention is to provide an automatically operated means for stopping extension or retraction of a multi-sectional conveyor.

In accordance with this invention there is provided a multiple-sectioned extensible conveyor comprising a main frame having a drive pulley and an idler pulley spaced horizontally therefrom. A plurality of movable frames are mounted within the main frame and each movable frame includes an idler pulley and a take-up pulley spaced from one another both vertically and horizontally. The belt is threaded over the idler pulleys and the take-up pulleys and these pulleys are so arranged that they fold the belt when the frames are retracted or unfold the belt when the frames are extended. For extending and retracting the frames with respect to one another a power-driven pulling means is threaded over the shafts of the respective pulleys in each frame.

In accordance with another feature of this invention there is provided a limit switch arrangement for controlling the power-driven pulling means to stop extension or retraction of the conveyor when the movable frames reach their normal limits of movement.

For a better understanding of the invention, together with other and further objects thereof, reference is made to the following description, taken in connection with the accompanying drawings, and its scope will be pointed out in the appended claims.

Fig. 1 of the drawings is a side elevational view, with parts broken away, of the conveyor in its extended position.

Fig. 2 of the drawings is a top view of the conveyor illustrated in Fig. 1, with parts removed for purposes of illustration.

Figure 3:
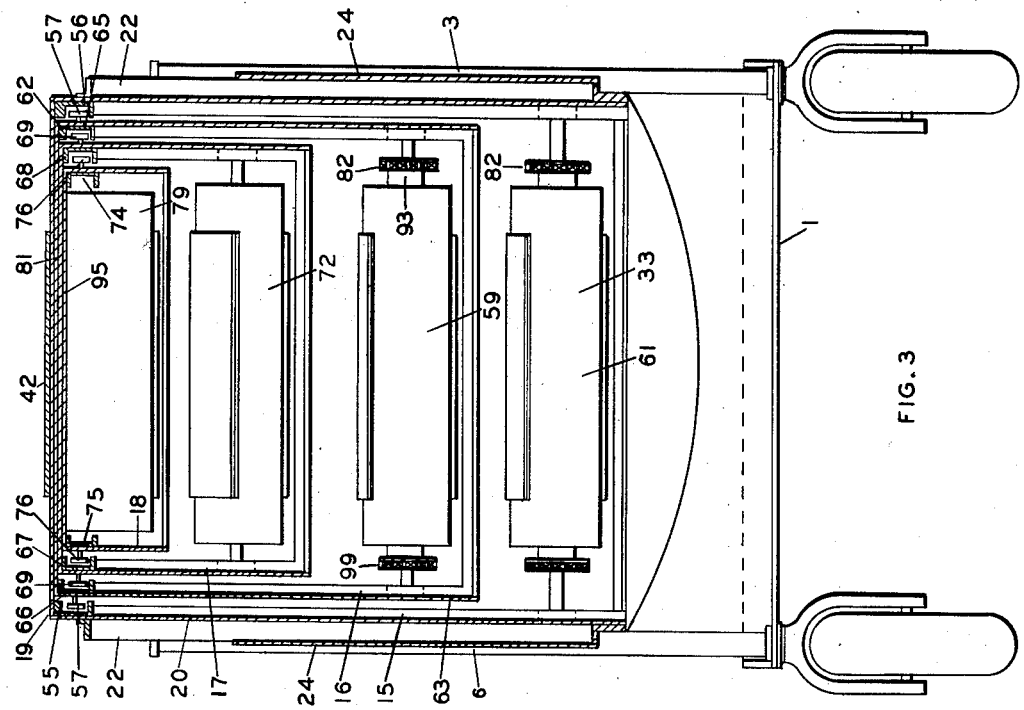
Fig. 3 is a sectional view taken on line 3—3 of Fig. 1 after the frames have been retracted.

Referring to the drawings: There is provided a truck for supporting a conveyor which comprises a base member 1 on which are mounted posts 3, 4, 5 and 6. The conveyor includes a main frame 15 and movable frames or sections 16, 17 and 18 which may be extended from the main frame to any desired length within the limit of movement of the movable frames or sections. The main frame 15 comprises a belt-supporting floor plate 19 (Fig. 3), suitable connected columns and girders to define a generally rectangular frame work as illustrated in the drawings and includes a pair of side panels 20 to which is secured a pair of supports 22 formed in the shape of a sector of a circle. Each of the supports 22 may be an angle iron and is L-shaped in cross-section so that it includes a shelf member projecting outwardly at right angles from the surface of the panel 20. A second pair of angle iron supporting members 24, also formed in the shape of a sector of a circle are hung from the posts 3, 4, 5 and 6 on the brackets 26 which are supported in each of the posts in any suitable conventional manner. The supporting members 22 and 24 illustrate one method of tiltably supporting the main frame 15 on the posts 3, 4, 5 and 6, but this structure does not form any part of this invention and hence is not shown or described in detail.

The main frame includes a pair of oppositely disposed brackets such as 32 which are adapted rotatably to support an idler pulley 33. There are also attached to panel 20 pairs of brackets such as 35 and 36 which are adapted rotatably to support idler pulleys 38 and 39 respectively. A drum 41 for driving a conveyor belt 42 is supported on a pair of brackets 43 which are in turn fixed to the panel 20 in any suitable manner.

At the upper edges of the main frame 15 there are secured a pair of channels or rails 55 and 56 (Fig. 3) which extend the full length of the upper edges of the panels 20. At the top edges of frame 16 there are provided a pair of channel members 65 and 66. The rails 55 and 56 accommodate rollers 57 which in turn are rotatably mounted on the channels 65 and 66 of the movable frame 16 whereby the frame 16 may be moved with respect to the main frame 15. Frame 16 is provided with a belt-supporting floor plate 62 situated directly beneath floor plate 19 of frame 15. A pair of brackets such as 58 are provided on frame 16 for supporting an idler pulley 59 and a pair of brackets 60 are provided at the rear of frame 16 for supporting a take-up pulley 61. These brackets are secured, as by welding, to each of the side panels 63 which comprise the sides of movable frame 16.

The movable frame 17 is constructed similarly to the frame 16 so that frame 17 may be extended from frame 16. Frame 17 includes channels or rails 67 and 68 (Fig. 3) attached to its side panels and rollers 69 which ride in the channels 65 and 66 of frame 16. Thus, the frame 17 may be extended from the frame 16. Frame 17 includes a belt-supporting floor plate 81, together with brackets 70 and brackets 71 for supporting an idler pulley 72 and a take-up pulley 73 respectively. Frame 18 is similar to frame 16 and includes a belt supporting plate 95, channels 74, 75, rollers 76, brackets 77 and brackets 78, idler pulley 79, and take-up pulley 80. For preventing the frames from running off the channels, there may be provided the stops 81 at the outer end of each frame and stops 81' at the inner end of each frame.

For extending and retracting the frames 16, 17 and 18, there is provided a tackle such as a chain 82 fixed as at 83 to the rear end of frame 18. Chain 82 extends from frame 18 over a drive wheel or sprocket 85 mounted on shaft 86 and driven from motor 87 through a chain and sprocket system 88. Chain 82 passes over a guide-wheel or sprocket 89 mounted freely on a suitable bearing on the shaft which supports pulley 38. Chain 82 also passes over guide-wheels or sprockets 91, 92, 93, 94 and 95 freely mounted on the shafts supporting pulleys 33, 59, 61, 72 and 73 respectively. The other end of chain 82 may be fixed to a column member 97 of frame 18 by means of any suitable anchoring means 98. A second tackle or chain 99 may be mounted on sprockets at the other ends of the respective pulley shafts in the same manner as described in connection with chain 82. Chain 99 may be driven by a drive sprocket 100 mounted on shaft 86.

Figure 4:
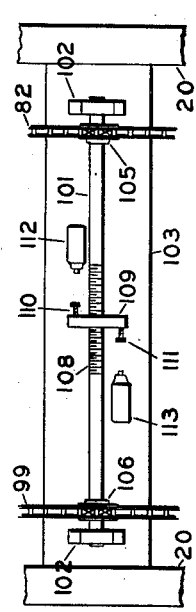
Fig. 4 is a detailed view, taken on line 4—4 of Fig. 1, of an automatically operating limit switch mechanism.
Figure 5:
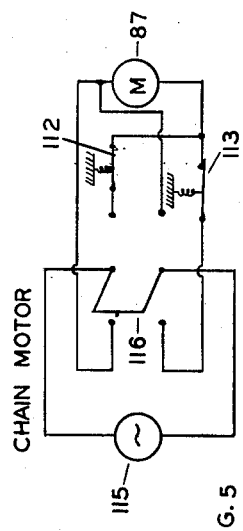
Figs. 5 and 6 are diagrams showing the circuits for energizing the motors shown in Fig. 2.

Figs. 4 and 5 illustrate a limit switch arrangement which is adapted to limit movement of the chain so that the frames of the conveyor may be extended or withdrawn only to their normal limits of movement. Referring to Fig. 4 there is shown a shaft 101 which may be mounted in a pair of pillow blocks 102 fixed to a strut 103 extending between and fixed to the panels 20 of main frame 15 in such a position that shaft 101 may be driven by chains 82 and 99. For providing this driving connection the sprockets 105 and 106 may be mounted on shaft 101 in driving engagement with chains 82 and 99. Shaft 101 is threaded as at 108 for receiving a threaded switch operating member 109 having adjustable switch contacting members 110 and 111 for moving into engagement with the normally closed switches 112 or 113. Thread 108 has such a pitch that the actuating member 109 travels from a position of engagement with switch 112, for example, to an engaging position with switch 113 when the frames of the conveyor make an excursion from their innermost position to their outermost position. Thus, for example, switch 112 may open to stop the conveyor when it is in its innermost position, and when the conveyor reaches its outermost position, actuating member 109 will have traversed screw threads 108 to a position for opening switch 113 whereby the frames may be stopped in their outermost position.

Fig. 5 illustrates an electrical circuit within which the normally closed switches 112 and 113 may operate to disconnect the motor 87 from a source of power 115. Double throw, double pole switch 116 is adapted to reverse the connections in conventional manner.

Figure 6:
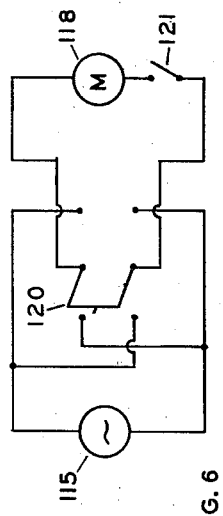

Fig. 6 of the drawings illustrates a circuit diagram adapted to connect the belt driving motor 118 which is adapted to drive the belt 42 through drum 41. The reversing switch 120 may be mounted on one of the side panels 20 on the main frame 15 and may be connected to the source of power 115 as illustrated in Fig. 6. These connections are conventional and need no further explanation. The switch 121 may be connected to motor 118 for permanently connecting or disconnecting it regardless of the position of switch 120.

Fig. 1 of the drawings illustrates the conveyor in its extended position. Switches 112 and 113 will be in closed position. For retracting the conveyor, switch 116 may be closed to energize motor 87 through switch 112, for example, and the sprockets 85 and 100 may be driven in a counterclockwise direction thereby exerting tension on the chains in a direction toward the main frame 15 thereby drawing frames 16, 17 and 18 into their telescoped position. It should be noted that, as the length of chain 82 and 99 between sprockets 85 and 100 and anchors 83 is decreased, the frames move inwardly, hitting stops 82 on frames 17 and 16 and moving the take-up pulleys 61, 73, and 80 to the rear, taking up the belt and taking up the chain which is pulled in with the telescoping frames. Inward movement continues until member 109 opens switch 112, thereby to stop retraction of the frames just before they meet stop 82 on frame 15.

When it is desired to extend the conveyor, switch 116 may be operated to connect motor 87 through switch 113 whereby it reverses and the sprocket 85 may be rotated in a clockwise direction pulling on chain 82 in the opposite direction. When the chain is pulled in this direction it takes up the chain between each of the idler pulleys and the take-up pulleys thereby pulling each frame outwardly until the frames are in their fully extended position. Stops 81 serve to limit the movement of each frame with respect to its supporting frame. When the frames reach this position the switch 113 will be opened to stop the chain driving motor.

While this invention has been shown in the drawings as including an extension and retraction apparatus comprising a chain and sprocket arrangement, it will be obvious to those skilled in the art that other tackle, such as rope or cable, and other guide wheels, such as grooved pulleys, may be substituted for the chain and sprocket system. Also, it is within the concept of this invention to use a single chain, rope, cable or the like in place of a pair of chains.

From the foregoing description it will be apparent that there is provided in accordance with this invention an apparatus for extending and retracting a conveyor mechanism which is simple and cheap to manufacture, does not require manufacture to close tolerances and is not subject to clogging or fouling by stone, grain or other material which may be handled on the conveyor.

What is claimed is:

1. A conveyor comprising a main frame, a plurality of frames movably supported in telescoped relation to said main frame, a pair of guide wheels spaced longitudinally from one another on each movable frame with the exception of the innermost of said frames, the guide wheels on an inner frame being in a plane above that of the wheels of an outer frame, continuous tackle extending between the wheels of each frame from the front wheel of an outer frame to the rear wheel of an inner frame, means for fixing the ends of the tackle to the innermost one of said telescoped frames, and driving means operatively associated with said tackle.

2. A conveyor comprising a main frame, a second frame movably supported in telescoped relation to said main frame, a pair of guide wheels spaced longitudinally from one another on said second frame, a third frame movably supported in telescoped relation with said second frame, a pair of guide-wheels spaced longitudinally from one another on said third frame in a plane above that of the wheels on said second frame, a fourth frame telescoped within said third frame, continuous tackle extending between the wheels of each frame and from the front wheel of an outer frame to the rear wheel of an inner frame, means for fixing the ends of the tackle to the rear of the fourth frame, and driving means in operative association with said tackle.

3. A conveyor comprising a main frame, a belt driving drum on said frame and an idler pulley spaced longitudinally thereof, a plurality of frames movably supported in telescoped relation to said main frame and to one another, idler pulleys and take-up pulleys spaced longitudinally from one another on each movable frame, the pulleys on an inner frame being in a plane above that of the pulleys on an outer frame, an endless belt extending over said drum and said frames and back between the pulleys of each frame and from the idler pulley of an outer frame to the take-up pulley of an inner frame, guide wheels mounted on all but the innermost of said frames in the same relationship to one another as said pulleys, continuous tackle extending over said guide wheels in the same path as that of the belt, means for fixing the ends of the tackle to the innermost frame, and driving means operatively associated with said tackle.

4. A conveyor comprising a main frame, a belt driving drum on said frame and an idler pulley spaced longitudinally thereof, a second frame movably supported in telescoped relation to said main frame, an idler pulley and a take-up pulley spaced longitudinally from one another on said second frame in a plane above that of the main frame idler pulley, a third frame movably supported in telescoped relation with said second frame, an idler pulley and a take-up pulley spaced longitudinally from one another on said third frame in a plane above that of the pulleys on said second frame, an endless belt extending over said drum and said frame and back from the pulleys of each frame and between the idler pulley of an outer frame to the take-up pulley of an inner frame, guide wheels mounted on said second frame in the same relationship to one another as said pulleys, continuous tackle extending over said guide wheels in the same path as that of the belt, means for fixing the ends of the tackle to the third frame, and driving means operatively associated with said tackle.

5. A conveyor comprising a main frame, a plurality of frames movably supported in telescoped relation to said main frame, front and rear wheels mounted on all but the innermost of said telescoped frames, continuous tackle extending over said wheels and from frame to frame for extending and retracting said telescoped frames, and driving means operatively associated with said tackle for pulling it in one direction or the other.

6. A conveyor comprising a main frame, a plurality of frames movably supported in telescoped relation to said main frame, tackle extending between the frames in such a manner as to exert tension for retracting or extending them, means for fixing the ends of the tackle to the inner one of said telescoped frames, and driving means on said main frame operatively associated with said tackle, said driving means comprising a screw threaded member driven by said tackle, switches connected to said driving means and disposed adjacent the ends of the thread on said threaded member, and switch actuating means engaging the threads of said threaded member and movable into engagement with one or the other of said switches when the frames are at one extremity or the other of their movement.

7. A conveyor comprising a main frame, a plurality of frames movably supported in telescoped relation to said main frame, tackle extending between the frames in such a manner as to exert tension for retracting or extending them, and driving means on said main frame operatively associated with said tackle, said driving means comprising a member driven by said tackle, switches connected to said driving means and spaced from one another adjacent to said member, and switch actuating means adapted to be driven by said member into engagement with one or the other of said switches when the frames are at one extremity or the other of their movement.

8. A conveyor comprising a main frame, a plurality of frames movably supported in telescoped relation to said main frame, tackle extending between the frames in such a manner as to exert tension from one frame to another for retracting or extending them, and driving means operatively associated with said tackle, switches connected to said driving means, and switch actuating means operatively associated with said tackle and movable into engagement with one or the other of said switches when the frames are at one extremity or the other of their movement.

References Cited in the file of this patent
UNITED STATES PATENTS
785,569    Plunket _____ Mar. 21, 1905